United States Patent [19]
Ohki

[11] Patent Number: 5,757,965
[45] Date of Patent: May 26, 1998

[54] IMAGE PROCESSING APPARATUS FOR PERFORMING COMPRESSION OF IMAGE DATA BASED ON SERIALLY INPUT EFFECTIVE SIZE DATA

[75] Inventor: Joji Ohki, Yokohama, Japan

[73] Assignee: Canon Kabushiki Kaisha, Tokyo, Japan

[21] Appl. No.: 317,460

[22] Filed: Oct. 4, 1994

Related U.S. Application Data

[63] Continuation of Ser. No. 794,006, Nov. 19, 1991.

[30] Foreign Application Priority Data

| Nov. 19, 1990 | [JP] | Japan | 2-311272 |
| Aug. 30, 1991 | [JP] | Japan | 3-219836 |
| Oct. 17, 1991 | [JP] | Japan | 3-269264 |

[51] Int. Cl.$^6$ .......................... H04N 1/00; H04N 1/40; H04N 1/393; G06K 9/36
[52] U.S. Cl. ..................... 382/232; 358/449; 358/404; 358/451; 358/448
[58] Field of Search ........................ 358/449, 404, 358/426, 444, 453, 451, 448, 468, 432, 433; 382/56, 305, 232, 239, 166; 395/114; H04N 1/40, 1/41, 1/00, 1/32; G06K 9/36, 9/46

[56] References Cited

U.S. PATENT DOCUMENTS

| 4,394,774 | 7/1983 | Widergren et al. | 382/56 |
| 4,658,299 | 4/1987 | Tanaka et al. | 358/448 |
| 4,754,492 | 6/1988 | Malvar | 382/56 |
| 4,791,680 | 12/1988 | Yokoe et al. | 382/56 |
| 4,808,987 | 2/1989 | Takeda | 340/721 |
| 5,016,114 | 5/1991 | Sakata et al. | 358/404 |
| 5,040,233 | 8/1991 | Davy et al. | 358/433 |
| 5,068,745 | 11/1991 | Shimura | 358/426 |
| 5,105,284 | 4/1992 | Sakata et al. | 358/404 |
| 5,177,620 | 1/1993 | Fukushima | 358/404 |
| 5,253,077 | 10/1993 | Hasegawa et al. | 358/404 |
| 5,285,290 | 2/1994 | Sakai et al. | 358/404 |
| 5,287,420 | 2/1994 | Barret | 382/235 |
| 5,331,424 | 7/1994 | Matsui et al. | 358/404 |
| 5,359,429 | 10/1994 | Takahashi | 358/439 |
| 5,363,206 | 11/1994 | Fukushima | 358/407 |
| 5,379,124 | 1/1995 | Ikegaya | 358/440 |
| 5,500,923 | 3/1996 | Kuroshima et al. | 395/114 |

FOREIGN PATENT DOCUMENTS

| 02100487 | 4/1990 | Japan | H04N 7/133 |
| 2172767 | 9/1986 | United Kingdom | H04N 1/41 |

OTHER PUBLICATIONS

Pat. Abstracts of Japan, vol. 14, No. 354 (E-958) (Kokai 2-122763), May 1990.

Pat. Abstracts of Japan, vol. 12, No. 17 (E-574) (Kokai 62-173874), May 1987.

*Primary Examiner*—Edward L. Coles, Sr.
*Assistant Examiner*—Kimberly A. Williams
*Attorney, Agent, or Firm*—Fitzpatrick, Cella, Harper & Scinto

[57] ABSTRACT

An image processing apparatus discriminates an effective size of input image data, compresses the input image data, and controls the compression in accordance with the discriminated effective size.

10 Claims, 11 Drawing Sheets

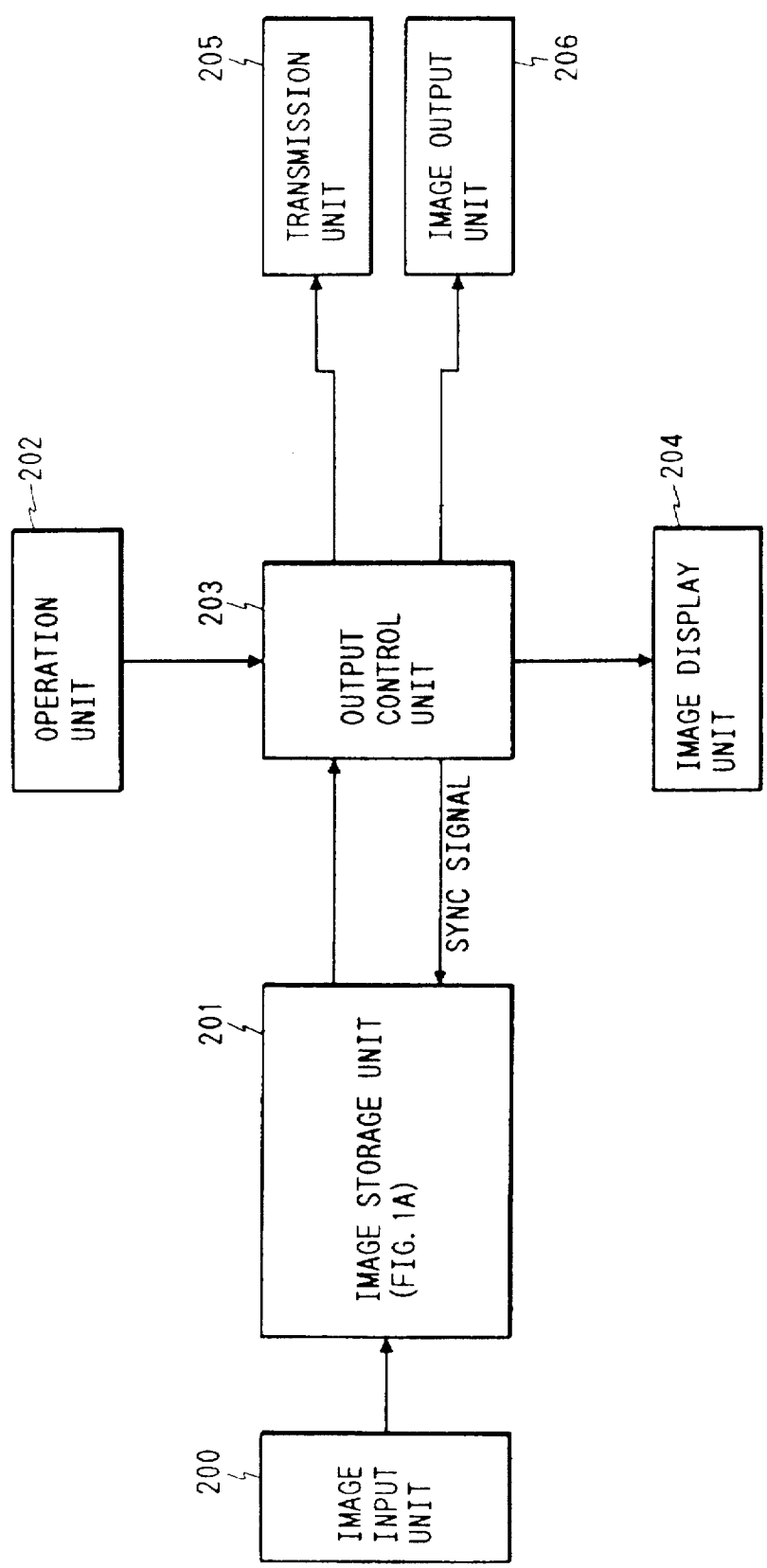

IMAGE PROCESSING APPARATUS FOR PERFORMING COMPRESSION OF IMAGE DATA BASED ON SERIALLY INPUT EFFECTIVE SIZE DATA

This is application is a continuation of application Ser. No. 07/794,006 filed Nov. 19, 1991.

BACKGROUND OF THE INVENTION

1. Field of the Invention

The invention relates to an image processing apparatus having image compressing means and compressed image storing means.

2. Description of the Related Background Art

For instance, a page printer system is a known example of an image processing apparatus having image compressing means and compressed image storing means. In such an image processing apparatus, the compression is performed at a predetermined compression ratio for an input image size.

The above conventional apparatus, however, has the following drawbacks.

When the input image size is large or when the memory size is relatively small, there is a fear that when the compression is performed at a low compression ratio, the compressed image data cannot be completely stored the compressed image storing means.

On the contrary, when the compression is performed at a high compression ratio, in the case of a small image, the content of the original image cannot be discriminated from the compressed data.

Hitherto, such kind of image processing apparatus has been widely applied to, for instance, a page printer system or the like. In such a page printer system, the image size is compressed to, for instance, a predetermined size and the compressed image data is recorded page by page. In the above case, the compressed image data is once stored to the compressed image storing means. In a case where the compressed image data cannot be completely stored to the compressed image storing means, hitherto, such a state is informed to the user, and the image data is again compressed, at a higher compression ratio, and the new compressed image data is input or the like.

On the other hand, when the user wants to finally set the size of the compressed image to a certain fixed size, there is used a method whereby a parameter relating to the control of the compression ratio is once fixed to a certain value and, after that, the image of, for example, one entire page is compressed to such size, and the image size is made to approach the desired size by repeating the above operation while changing the parameter.

However, as in the above conventional image processing apparatus, in the case of using the method whereby when the compressed image data cannot be completely stored, the image data is further compressed at progressively higher compression ratios and the compressed image data is again input until a satisfactory result is attained, or a method whereby in order to fix the size of the entire input image at a predetermined size, the data for the whole image is repetitively compressed while changing the parameter, it takes a long time for such processing, it is troublesome, and ease of in use is poor.

SUMMARY OF THE INVENTION

It is an object of the invention to provide an image processing apparatus which can solve the above problems.

Another object of the invention is to provide an image processing apparatus which can preferably execute the compression irrespective of an input image size.

Still another object of the invention is to provide an image processing apparatus which can preferably execute the compression irrespective of the kind of input image.

Still another object of the invention is to provide an image processing apparatus which can set a compression ratio at a high speed.

Yet another object of the invention is to provide an image processing apparatus which can preferably execute the compression in accordance with a residual amount in an image memory to store compressed data.

According to a preferred embodiment of the invention, to accomplish the above objects, there is disclosed an image processing apparatus which detects a residual amount in an image memory and properly controls a compression ratio of image data in accordance with the residual amount.

Another object of the invention is to provide an image processing apparatus which can preferably execute the compression in accordance with the number of input images to be printed.

Still another object of the invention is to provide a novel printer controller.

Yet another object of the invention is to provide a novel compressing method using an orthogonal transformation.

The above and other objects and features of the present invention will become apparent from the following detailed description and the appended claims with reference to the accompanying drawings.

BRIEF DESCRIPTION OF THE DRAWINGS

FIG. 13 is a digram showing an application example of the invention.

DETAILED DESCRIPTION OF THE PREFERRED EMBODIMENTS

An embodiment of the invention will be described in detail hereinbelow with reference to the drawings.

Figure 1:
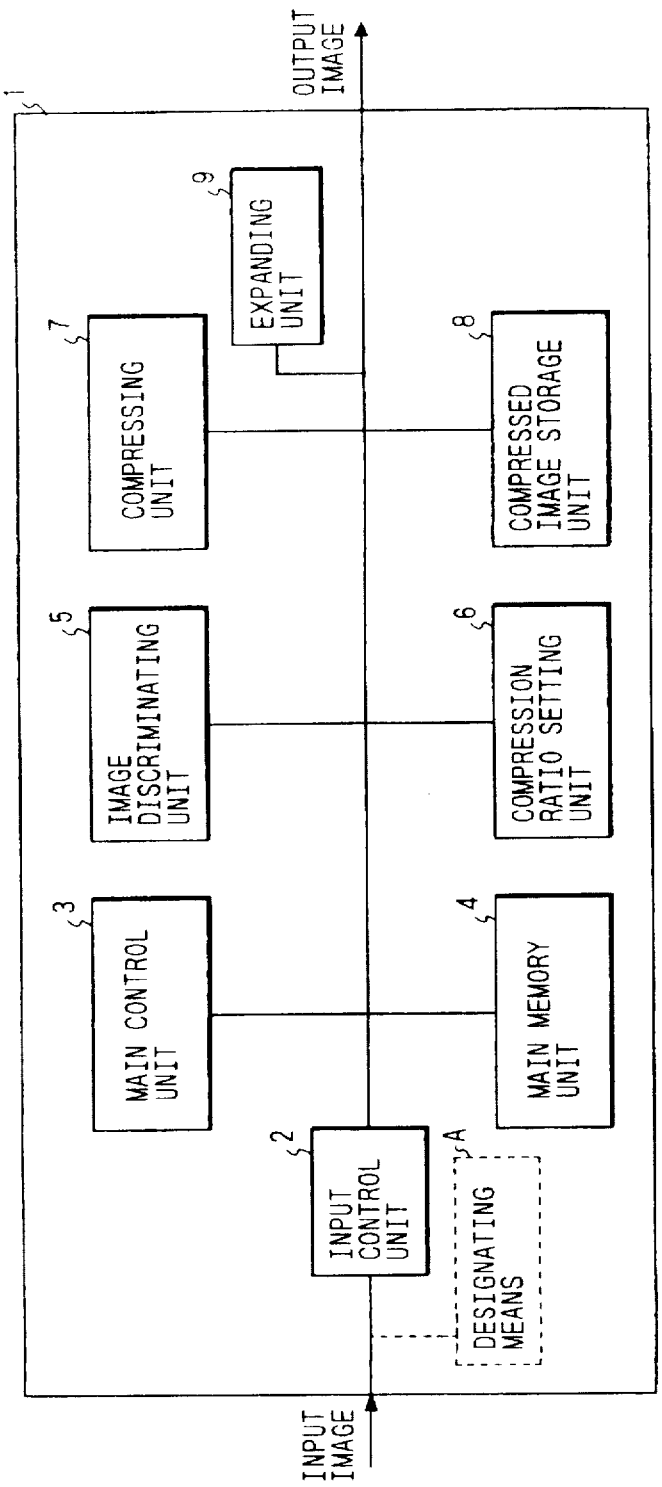
FIG. 1 is a system constructional diagram of an image processing system according to an embodiment of the invention.

Description of construction (FIG. 1)

FIG. 1 is a system constructional diagram showing an image processing apparatus according to this embodiment.

Figure 3:
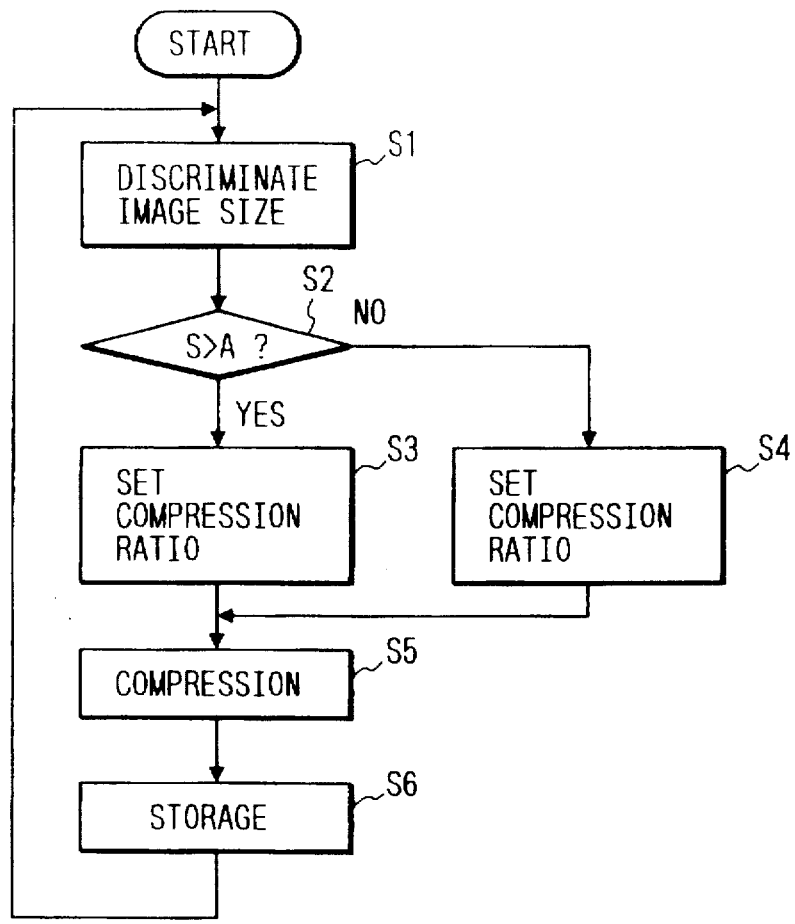
FIG. 3 is a flowchart showing an image compressing process in the embodiment of FIG. 1

In an image processing apparatus 1, a main control unit 3 comprises a CPU to control the whole image processing apparatus 1 of the embodiment in accordance with a program showing FIG. 3, which will be explained hereinbelow, and its peripheral circuits. Reference numeral 2 denotes an input control unit to execute an input control of input image data; 4 a main memory unit to store compressed data and the like in addition to the image processing program which is executed by the main control unit 3 mentioned above; 5 an image discriminating unit to discriminate the size of an input image; and 6 a compression ratio setting unit to set a proper compression ratio from the image size discriminated by the image discriminating unit 5. The setting unit 6 sets a quantization matrix for compression, a compressing method, and the like. Reference numeral 8 denotes a compressed image storage unit comprising, for example, a magnetic disk apparatus or the like. The storage unit 8 stores the image compressed by a compressing unit 7 and generates as necessary. In the case of generating data, it is also possible to expand the data by an expanding unit 9 and to generate.

<Data format (FIG. 2)>

Figure 2:
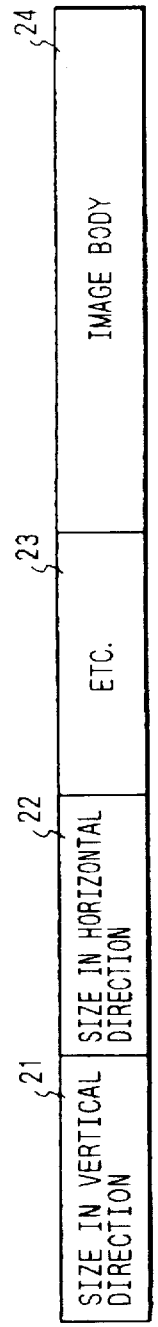
FIG. 2 is a diagram showing an example of an image data format which is used in the embodiment of FIG. 1

An example of an image data format which is used in the image processing apparatus 1 with the above construction will now be described hereinbelow with reference to FIG. 2.

As shown in the diagram, in this embodiment, image data is constructed of a header portion comprising frames 21 to 23 and image body 24. The header portion (21 to 23) includes the vertical size frame 21 indicative of the size of image in the vertical direction, horizontal size frame 22 indicative of the size of image in the horizontal direction, and another frame 23 to write comments or other information. Information (image) which is written into the frame of the image body 24 relates to all of images which can be handled as digital data.

<Description of processing procedure (FIG. 3)>

A compressing process in the image processing apparatus 1 according to the embodiment will now be described hereinbelow with reference to a flowchart shown in FIG. 3.

As mentioned above, the image processing apparatus 1 executes the following processes under the control of the main control unit 3 in accordance with the image processing program stored in the main memory unit 4. When an input image is supplied to the input control unit 2 and the image is detected by the input control unit 2, the process in step S1 is started. In step S1, the image discriminating unit 5 checks the size kind frames 21 and 22 of the received image and discriminates a size S of the image.

After the image size is discriminated, the processing routine advances to step S2. When an image size S is larger than a predetermined size value A, step S3 follows. When it is equal to or smaller than the value A, step S4 follows. In each of the steps S3 and S4, the compression ratio setting unit 6 selects the compression ratio according to the image size. In step S2, the discriminating value can instead be made finer and the compression ratio can also be more finely set.

In step S5, the input image is compressed at the compression ratio set in step S3 or S4. The compressed image is stored in the compressed image storage unit 8 in step S6.

In the case where a plurality of images are supplied to the input control unit 2, the sizes of those plurality of images are added and the total synthesized image size is judged. The compression ratio setting unit 6 sets the compression ratio in according with such an image size.

As described above, according to the embodiment, the input image is compressed at the compression ratio according to the input image size and stored in the compressed image storing means, so that the image can be compressed at a proper compression ratio and the storing means can be effectively used.

In the above embodiment, the image discriminating unit 5 checks the size frames 21 and 22 of the received image. In place of them, however, it is also possible to construct the apparatus in a manner such that data indicative of an effective area to be stored into the memory is supplied independently of the size of the received image and the compression ratio setting unit 6 automatically sets the compression ratio on the basis of the data indicative of such an effective area.

That is, designating means A such as a digitizer or the like for manually designating the effective area to be stored in the received image is provided, only the data in the area designated by the designating means is stored into the memory, and the compression ratio setting unit 6 sets the compression ratio in according with the size of area designated as mentioned above.

The second embodiment of the invention will now be practically explained in detail.

Figure 4A:
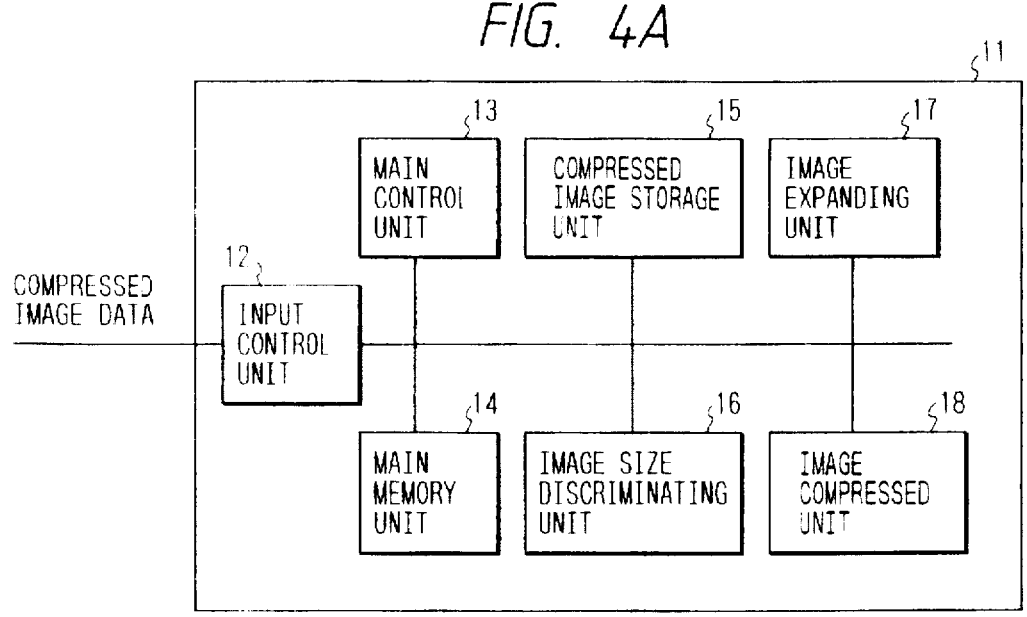
FIG. 4A is a block diagram showing a system construction according to the second embodiment of the invention.

FIG. 4A shows an example of a construction according to the first format of the invention. Reference numeral 11 denotes an image processing apparatus; 12 an input control unit to execute controls regarding compression and expansion for compressed image data which is supplied to the image processing apparatus 11; 13 a main control unit which has the function of a CPU and includes a procedure, which will be explained hereinbelow, and controls the whole apparatus 11 in accordance with each program stored in a main memory unit 14 in the ROM; 15 a compressed image storage unit constructed of a magnetic disk or the like; and 16 a size discriminating unit to discriminate the size of compressed image data which is supplied to the apparatus 11.

Further, in this embodiment, the image processing apparatus 11 has an image expanding unit 17 and an image compressing unit 18. The image expanding unit 17 has a function to expand the compressed image back into the image of the original size in a case where the compressed image data which has been supplied cannot be completely stored in a memory area of the memory size which is available in the compressed image storage unit 15. On the other hand, a quantization matrix and a method for compression are set by the image compression unit 18. The image compressing unit 18 has a function to again compress the image expanded by the image expanding unit 17, applying a compression ratio at which the compressed data can be stored in the compressed image storage unit 15.

Figure 5:
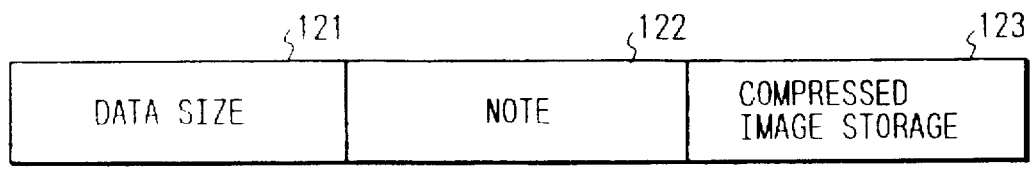
FIG. 5 is an explanatory diagram of a format of compressed image data in FIG. 4A.

FIG. 5 shows an example of a format of the compressed image data which is supplied to the image processing apparatus 11 of the embodiment. That is, in the format according to the example, each set of data is constructed by an arrangement of frames 121 to 123. Reference numeral 121 denotes the size frame indicative of the data size of the compressed image which is supplied; 122 the note frame in which comments to the input image and other information are written; and 123 the image storage frame in which the compressed image is stored.

Figure 6:
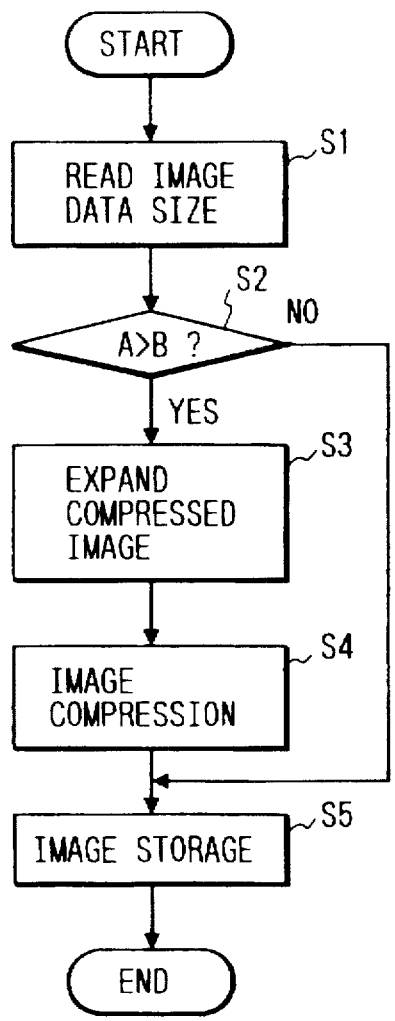
FIG. 6 is a flowchart showing an operating procedure in the control upon image processing according to the second embodiment of the invention.

An operating procedure of the input compressed image process according to the embodiment will now be described in accordance with FIG. 6 with reference to FIGS. 4A and 5.

The following procedure is stored in the main memory unit 14 in the ROM. First, when the image data is supplied to the input control unit 12, the input control unit 12 discriminates the data size written in the frame 121 in step S1 on the basis of the format of the input image data. When it is determined that the data size is equal to A, the size discriminating unit 16 compares the size A and a size B (hereinafter, referred to as a memory size) at which the compressed data can be stored in the compressed image storage unit 15, thereby discriminating whether A>B or not in step S2. If NO in step S2, namely, when it is determined that the input image data size A is equal to or less than the memory size B at which the data can be stored, step S5 follows and the input compressed image is directly stored in the storage unit 15. That is the image data is directly stored in the storage unit 15 without compressing. When it is decided in step S2 that the data cannot be stored, step S3 follows and the input compressed image is expanded back to the image of the original size by the image expanding unit 17. In step S4, the expanded image is recompressed by the image compressing unit 18 at a compression ratio such as to be matched with the memory size B. After that, the processing routine advances to step S5 and the compressed (or more exactly, recompressed) image data is stored in the storage unit 15.

In the above procedure, the image data is compressed by using a compression ratio such as to match the memory size B in step S4. However, such compression ratio can be also fixed in advance to a value such that the data is compressed to a size which is equal to or smaller than the memory size B.

In the image processing apparatus with the above construction, there is no need to execute complicated operations such that for the compressed image which is supplied, the user checks to see if it can be stored in the compressed image storage unit or not and, in the case where it cannot be stored, the image data further compressed with a new compression ratio is again stored in the storage unit.

An embodiment according to the second format of the invention will now be described.

Figure 4B:
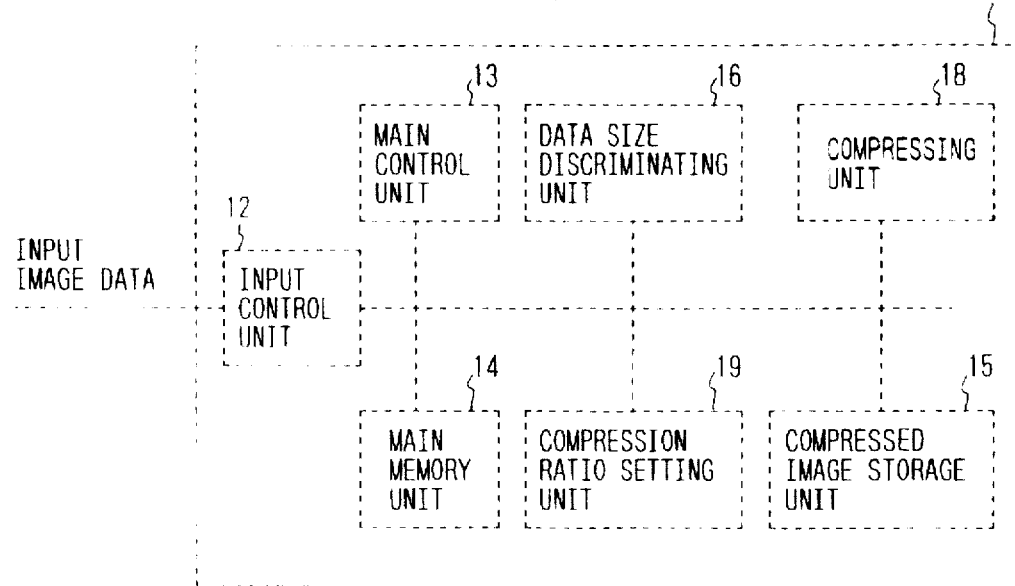
FIG. 4B is a block diagram showing a system construction according to the second format of the invention.

FIG. 4B shows a construction according to this embodiment. As already mentioned above, the embodiment relates to an image processing apparatus 20 in which when a predetermined image is compressed in a predetermined fixed size, the image is divided into images of several compression units, a proper compression ratio suitable to set the image size to a fixed size is obtained with respect to one of the divided compression units, the other compression units are successively compressed by such compression ratio, and one predetermined image is compressed into an image of the fixed size as mentioned above and is stored. This embodiment, therefore, has the feature that a compression ratio setting unit 19 is provided. A quantization matrix and a compressing method for image compression are set by the compression ratio setting unit 19. The image of the compression unit is first compressed by the compressing unit 18 at a compression ratio which has been predetermined by a variable length coding method. After that, the data size after completion of the compression is discriminated by the size discriminating unit 16.

A procedure of the image compressing operation according to the embodiment will now be described hereinbelow in accordance with FIG. 7 with reference to FIG. 4B.

When image data is supplied, the image is first detected by the input control unit 12. A compression ratio which is applied to a compression unit is set by the setting unit 19 in step S11. The first compression unit as an object for compression for the compression S12. In step S13, the compression for the compression unit is executed in the compressing unit 18. In step S14, the data size S of the compressed image data of the compression unit is discriminated by the data size discriminating unit 16 in step S14. In step S15, a check is made to see if the data size S is larger than the value A corresponding to a predetermined fixed size or not.

When S is larger than A, it is necessary to reduce the image size to a smaller size. In step S16 therefore, a parameter by which a compression ratio which is higher than the value so far can be expected is set by the compression ratio setting unit 19 and the compression is again corrected by the compressing unit 18. On the contrary, when the data size S is equal to or less than the value A in step S15, a parameter by which a compression ratio which is lower than the value so far can be expected is selected in step S17 and the compression is again corrected in a manner similar to the above. A check is made in step S18 to see if the correction compression by the above procedure has been executed with respect to each of the compression of the final compression unit, the processing routine is finished.

In the above procedure, in step S14, the data size is discriminated for each compression unit by the data size discriminating unit 16. However, in place of the above processing step, it is also possible to construct the apparatus in a manner such that after each compression unit is once compressed by repeating the processing until step S13, the data size of the whole compressed data is discriminated in step S14 and a compression ratio is set in accordance with the result of the judgement in step S15.

In the image processing apparatus constructed as mentioned above, the compression units of the divided images are extracted and the proper compression is executed so as to finally obtain the fixed size. The compressed image of the fixed size can be obtained in a short time by using a variable length coding method.

As described above, according to FIG. 4A, the image processing apparatus comprises: the discriminating means for discriminating the data size of the compressed image data; the means for expanding the compressed image data into the image data before the compression in the case where it is determined that the data size of the compressed image data discriminated by the discriminating means is lager than the memory size in the storing means; and the compressing means for again compressing the expanded image data to the image data such that it can be stored in the storing means. Therefore, there is no need to execute the troublesome conventional procedure wherein each time a compressed image is supplied, a check is made to see if the image can be stored in the storing means or not and the compressed image data is again stored. Thus an image processing apparatus which can be easily used is provided.

According to FIG. 4B, the image processing apparatus comprises: the discriminating means for discriminating the data size of the compressed image which is obtained by compressing one of the images of the compression units derived by dividing one image by the compressing means; and the compression ratio setting means for setting a compression ratio such that the image of a predetermined data size is derived on the basis of the data size discriminated by the discriminating means, wherein each of the images of the compression units obtained by dividing the image is compressed at such a set compression ratio. Therefore, the image of the compression unit can be easily compressed by the variable length coding method. With respect to one compression unit, the compression ratio suitable to set into the fixed size is obtained and can be applied to the whole image.

Thus, it is possible to provide the image processing apparatus which can be easily used by the user and in which the optimum compression ratio suitable to store the data in the storing means can be easily found.

The fourth embodiment of the invention will now be described in detail.

<Description of construction (FIG. 8)>

Figure 8:
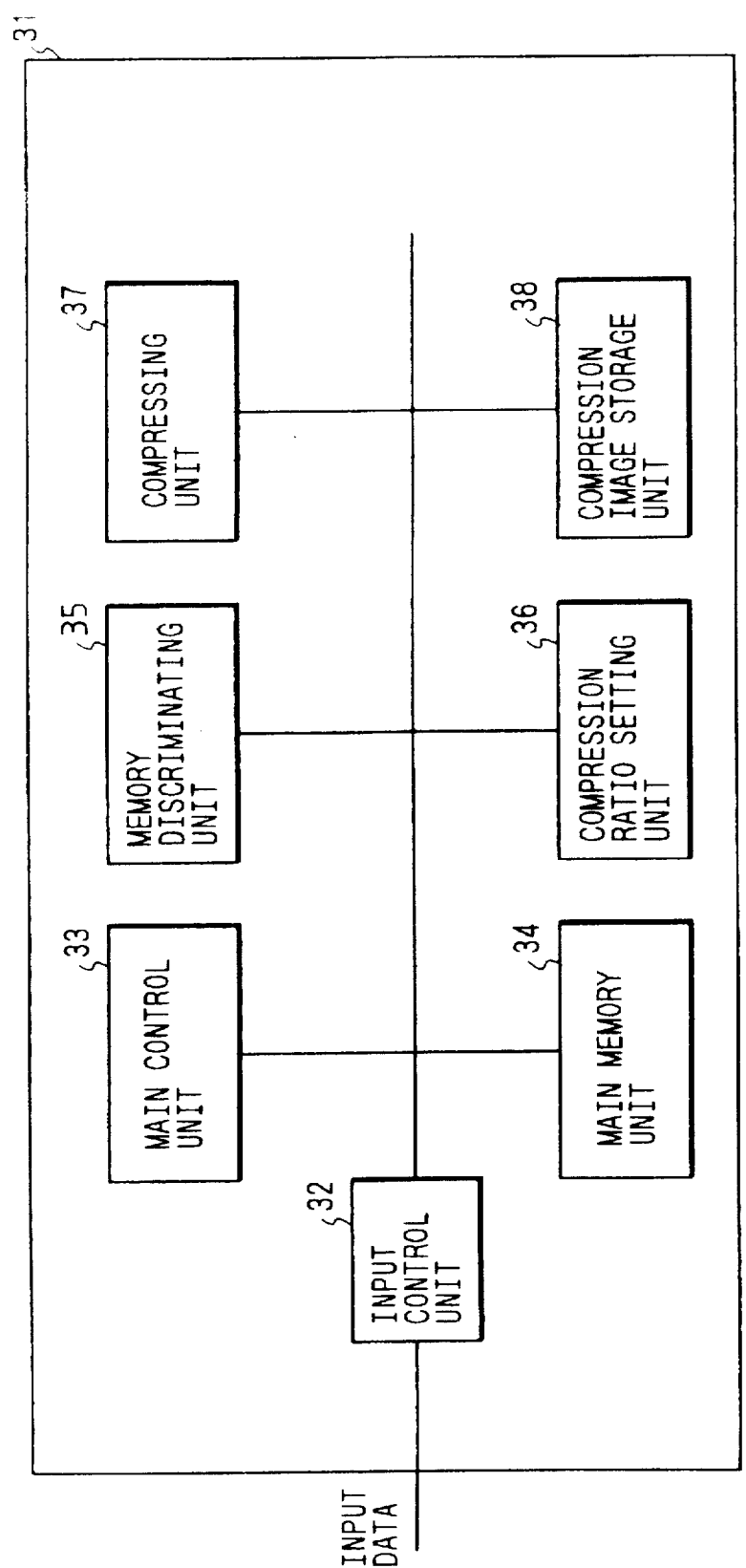
FIG. 8 is a schematic block diagram showing a construction of an image processing apparatus according to the fourth embodiment of the invention.

FIG. 8 is a schematic block diagram showing a construction of an image processing apparatus of this embodiment. As shown in the diagram, an image processing apparatus 31 of this embodiment comprises: an input control unit 32 to execute an input control of image data which is sent from an information processing apparatus (not shown); a main control unit 33 which is constructed by a CPU to control the whole apparatus in accordance with a processing procedure (program) shown in FIG. 9, which will be explained hereinbelow, and its peripheral circuits; a main memory unit 34 to store the image processing program which is executed by the main control unit 33 and various kinds of data and the like; a memory discriminating unit 35 to discriminate a residual memory size in a compressed image storage unit 38; a compression ratio setting unit 36 to set a proper compression ratio from the memory size discriminated by the memory discriminating unit 35; a compressing unit 37 to compress the image on the basis of the compression ratio set by the compression ratio setting unit 36; and the compressed image storage unit 38 such as a magnetic disk device or the like to store the image compressed by the compressing unit 37.

The compression ratio setting unit 36 in this embodiment sets a desired compression ratio by changing a quantization matrix for compression, a compressing method, or the like.

<Description of processing procedure (FIG. 9)>

A compressing process in the embodiment will now be described hereinbelow in accordance with a flowchart shown in FIG. 9.

As mentioned above, the image processing apparatus executes the following processes under the control of the main control unit 33 in accordance with the image processing program stored in the main memory unit 34.

When the transmitted image data is detected by the input control unit 32, the process in step S1 is started. In step S1, the memory discriminating unit 35 discriminates the residual memory size S in the compressed image storage unit 38.

After that, when the residual memory size S is detected, the processing routine advances to step S2 and the residual memory size S is discriminated by comparing the residual memory size S with a certain value A. Thus, when the residual memory size S is equal to or smaller than the value A, step S3 follows and the compression ratio setting unit 36 selects the quantization matrix for compression, compressing method, or the like from the residual memory size S sets the proper compression ratio. When the size S is larger than the value A in step S2, step S4 follows and a predetermined compression ratio is set. In the above step S2, the discrimination value regarding the residual memory size can also be more finely divided and the compression ratio can also be finely set. The compression ratio is set by a method whereby a table in which a quantization matrix for compression, a compressing method, or the like is made and which corresponds to the residual memory size S, is formed in advance and such table is selected to thereby set the compression ratio.

In the next step S5, the compressing unit 37 compressions the input image data on the basis of the set compression ratio. After completion of the compression, the processing routine advances to step S6, the compressed image data is stored in the compressed image storage unit 38 and the processing routine is finished.

According to this embodiment as described above, the compression ratio is set in accordance with the memory size in the compressed image storage unit 38 and the compressed image is stored, so that the storage unit 38 can be effectively used.

In this embodiment, when the residual memory size S in the compressed image storage unit 38 is larger than the certain value A, the data is compressed at a predetermined compression ratio. However, when there is a surplus in the residual memory size S, the data may instead be directly stored without compression. Consequently, the processing time can be reduced.

This embodiment can be also applied to a system comprising a plurality of apparatuses or to just one apparatus. This embodiment can also obviously be applied to a case where the invention is accomplished by supplying a program to such a system or apparatus, instead of through hardware.

According to the embodiment as described above, in the image processing apparatus having the image compressing means for compressing an image and the compressed image storing means for storing the compressing image, the apparatus comprises the discriminating means for discriminating the memory size in the compressed image storing means and the setting means for setting the compression ratio in accordance with the memory size discriminated by the discriminating means. Therefore, the compressed image storing means can be effectively used and ease in using the apparatus can improved.

Constructions of the compressing unit 7 and compressed image storage unit 8 in the embodiment will described with reference to FIG. 10

Figure 10:
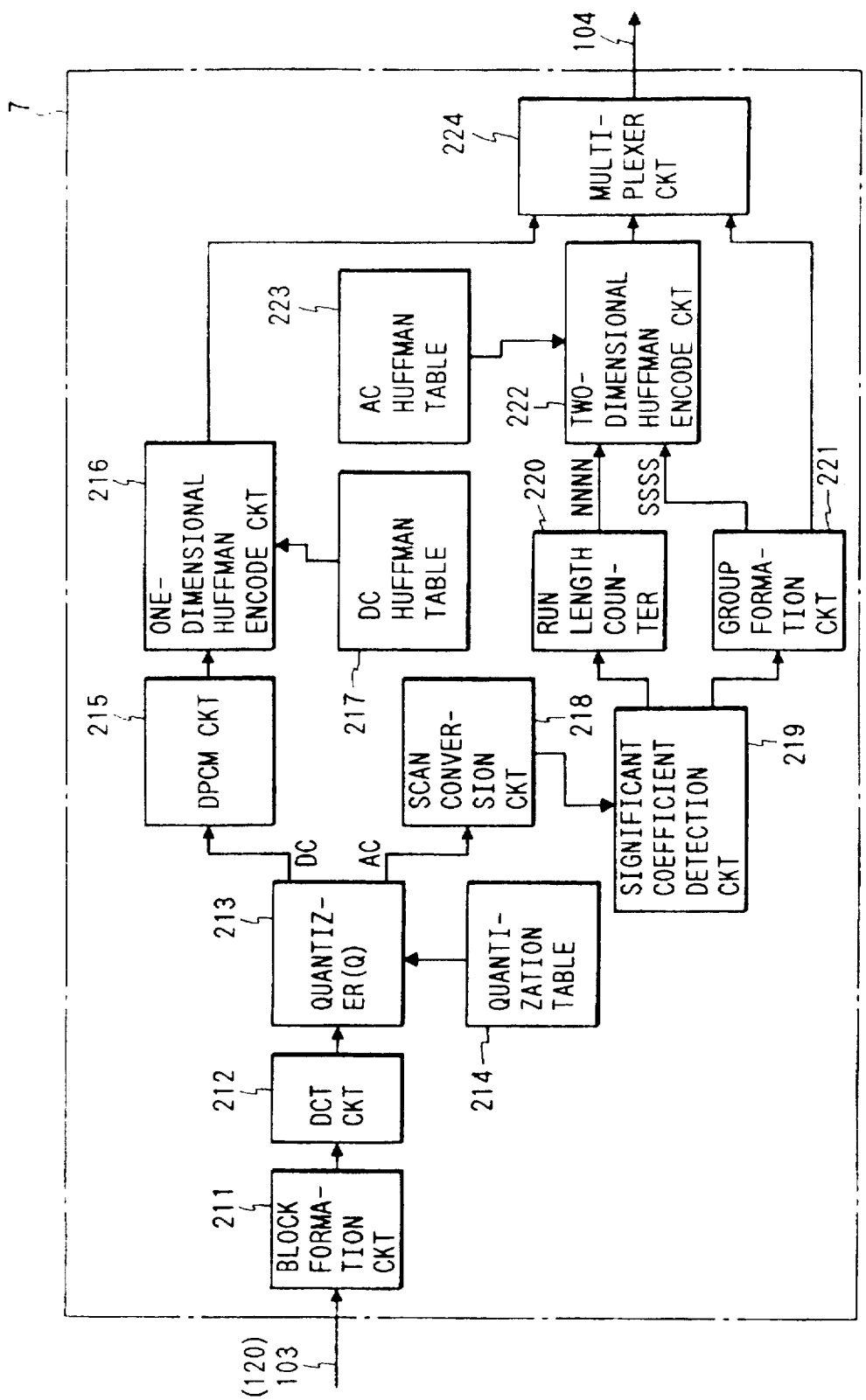
FIG. 10 is a block diagram showing a detailed construction of a compressing unit.

FIG. 10 is a block diagram showing a practical constructed example of the compressing unit 7. The embodiment shows a coding section of the Baseline System as an international standardization idea for encoding a color still image which has been proposed in the JPEG (Joint Photographic Expert Group), a group work organization of ISO and CCITT.

Figure 11:
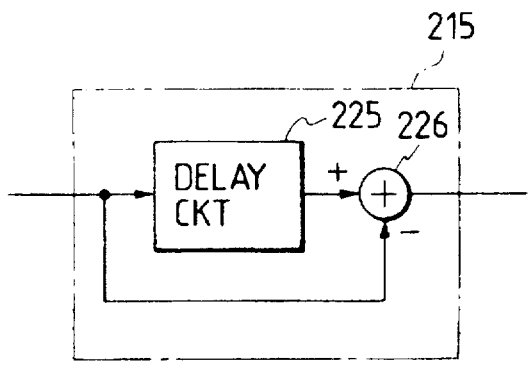
FIG. 11 is a diagram showing the details of a DPCM circuit 215.

Image data of every pixel supplied from a signal line 103 is cut out into blocks of 8×8 pixels by a block formation circuit 211 which is constructed by line memories of a few lines and cosine transformed by a discrete cosine transforming (DCT) circuit 212. Transformation coefficients are supplied to a quantizer (Q) 213. The quantizer 213 executes a linear quantization of the transformation coefficients in accordance with quantization step information which is supplied from a quantization table 214. For instance, the transformation coefficients are divided by the value indicative of the quantization step. Among the quantized transformation coefficients, the Dc coefficient is supplied to a predictive coding circuit (DPCM) 215, by which a difference (prediction error) between the DC coefficient and the DC component of the preceding block is calculated and supplied to an one-dimensional HUFFMAN encode circuit 216. FIG. 11 is a detailed block constructional diagram of the DPCM 215. The DC coefficient quantized by the quantizer 213 is supplied to a delay circuit 225 and a subtracter 226. The delay circuit 225 delays the input signal by only a time necessary for the DCT circuit 212 to calculate one block, namely, 8×8 pixels. Therefore, the DC coefficient of the preceding block is supplied from the delay circuit 225 to the subtracter 226. Thus, a difference (prediction error) between the preceding block and the DC coefficient is generated as an output signal of the subtracter 226. In the predictive endcoding, since the preceding block value is used as a prediction value, the predictor is constructed by the delay circuit as mentioned above.

The HUFFMAN encode circuit 216 variable length encodes the prediction error signal supplied from the DPCM 215 in accordance with a DC HUFFMAN code table 217 and supplies a DC HUFFMAN code to a multiplexer circuit 224.

Figure 12A:
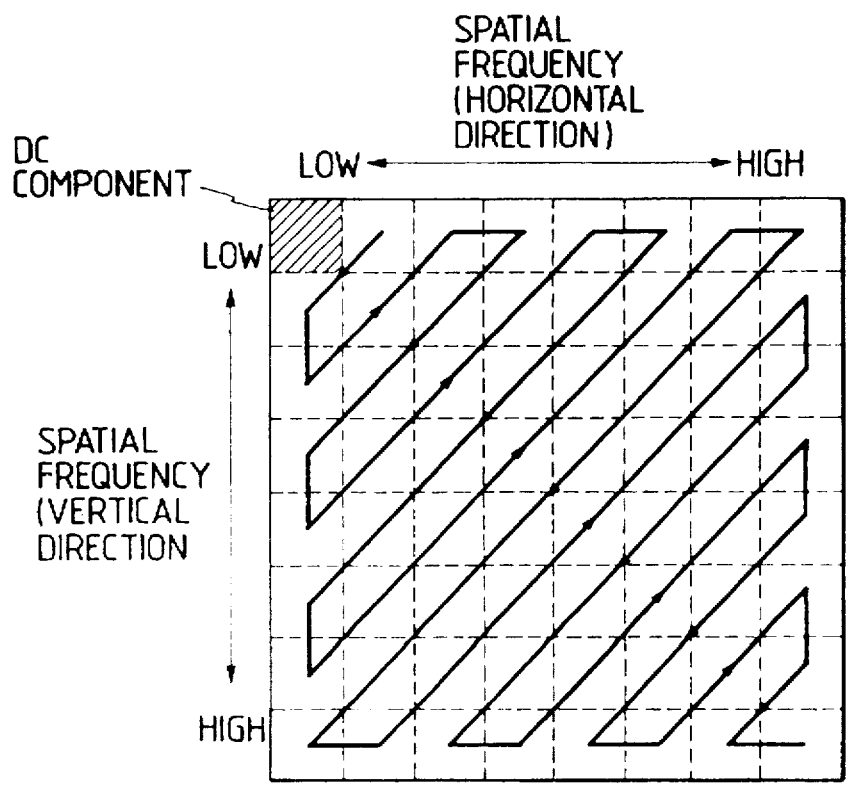
FIGS. 12A and 12B are diagrams for explaining the operation of the compressing unit in FIG. 10.
Figure 12B:
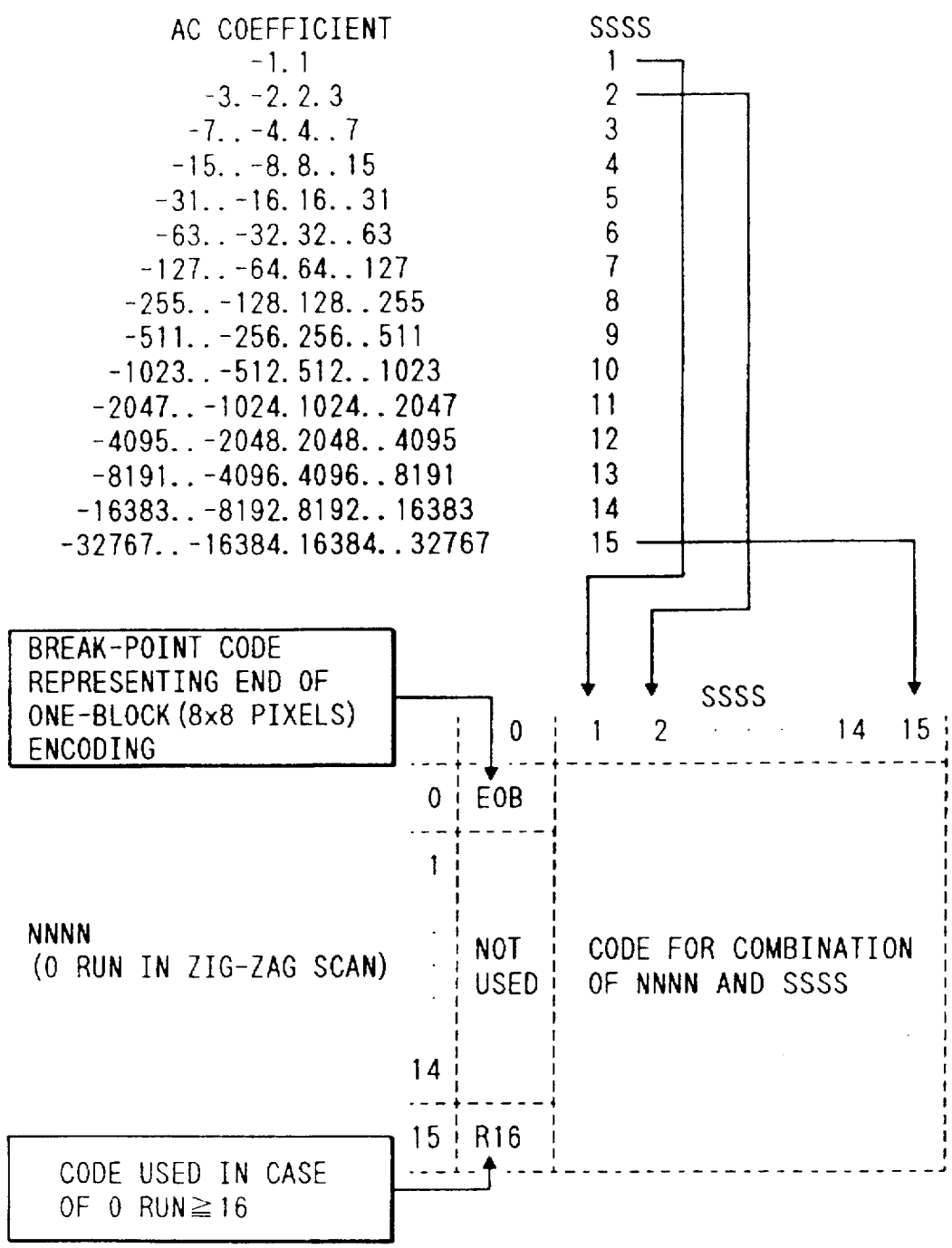

On the other hand, AC coefficients (coefficients other than the DC coefficient) quantized by the quantizer 213 are sequentially zig-zag scanned from the lower-degree coefficient by a scan conversion circuit 218 as shown in FIG. 12A and are supplied to significant coefficient detection circuit 219. The detection circuit 219 discriminates whether the quantized AC coefficients are equal to "0" or not. When they are "0", a count-up signal is supplied to a run length counter 220, thereby increasing a count value of the counter by "+1". On the other hand, in the case of the coefficients other than "0", a reset signal is supplied to the run length counter 220, thereby resetting the count value of the counter. The coefficients are divided into a group numbers SSSS and additional bits by a group formation circuit 221 as shown in FIG. 12B. The group number SSSS and supplied to a two-dimensional HUFFMAN encode circuit 222 and the additional bits are supplied to the multiplexer circuit 224, respectively. The run length counter 220 is a circuit to count a run length of "0" and supplies the number NNNN of "0" between the significant coefficients other than "0" to the two-dimensional HUFFMAN encode circuit 222. The HUFFMAN encode circuit 222 variable length encodes the run length NNNN of "0" and the group numbers SSSS of the significant coefficients supplied in accordance with and AC HUFFMAN code table 223 and supplies an AC HUFFMAN code to the multiplexer circuit 224.

The multiplexer circuit 224 multiplexes the DC HUFFMAN codes, AC HUFFMAN codes, and additional bits of one block (8×8 input pixels) and generates the compressed image data from a signal line 104.

Therefore, by storing the compressed data supplied from the signal line 104 in a memory and by expanding the compressed data by the opposite operation upon compression mentioned above in the reading mode, the memory capacity can be reduced.

In the above embodiment, by controlling the quantization coefficients by the quantizer 213, the data amount after the encoding is finally performed can be controlled.

That is, when the quantization step is increased, the level of the output of the DCT circuit 212 which is divided by the value indicative of such quantization step decreases. Consequently, the value of the quantized AC coefficient decreases, the frequency of appearance of "0" rises and the data amount after completion of the HUFFMAN encoding can be relatively reduces.

In the above embodiment, accordingly, in a case where, for instance, the image size discriminated by the image discriminating unit 5 in FIG. 1 is relatively large, indicative of the above quantization step to a large value, so that a high compression ratio can be obtained.

Figure 7:
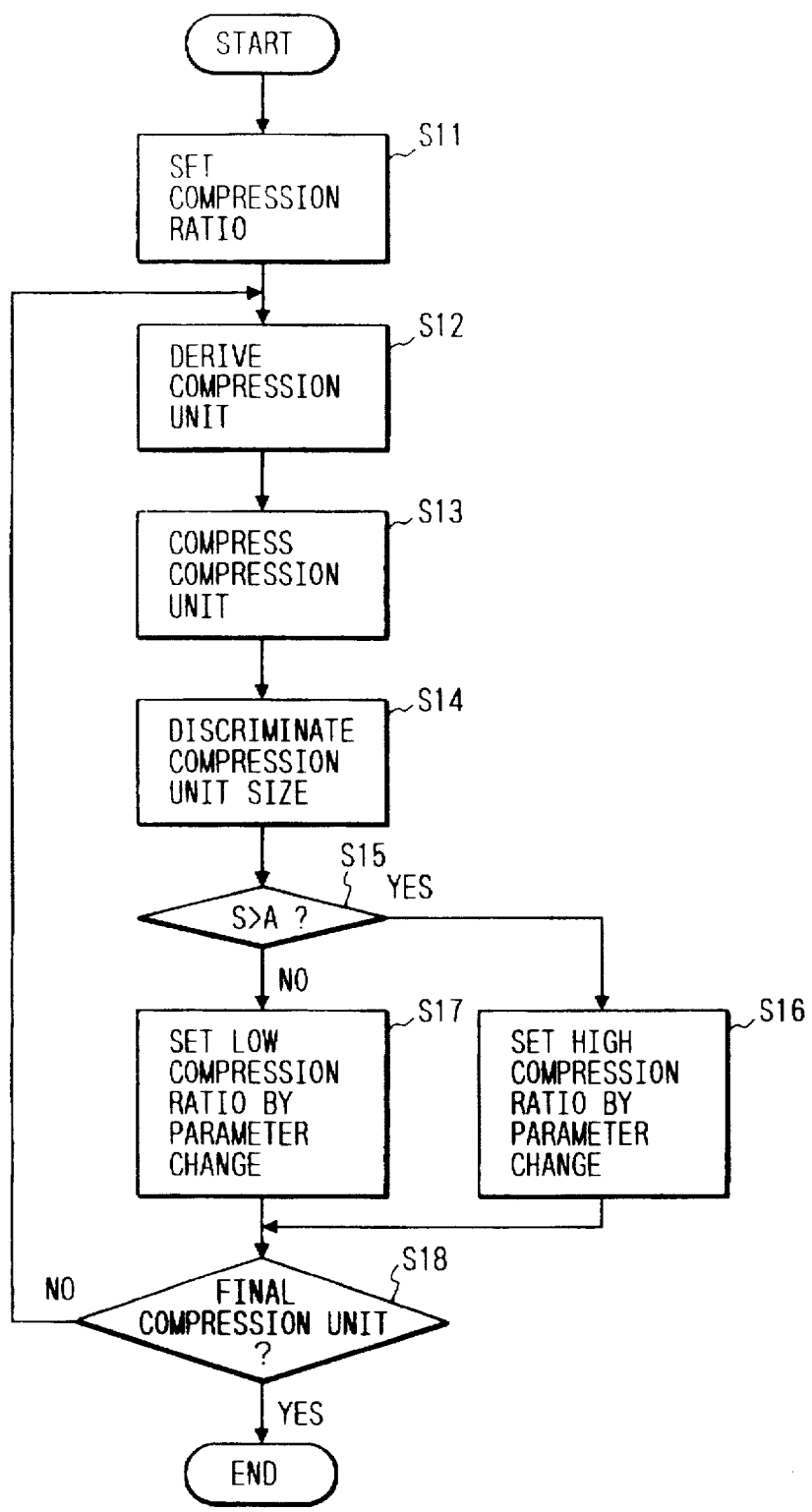
FIG. 7 is a flowchart showing an operating procedure in the control upon image process according to the third embodiment of the invention.

In step S11, to set the compression ratio in FIG. 7, also, the compression ratio can be similarly controlled by controlling the quantization step.

Figure 9:
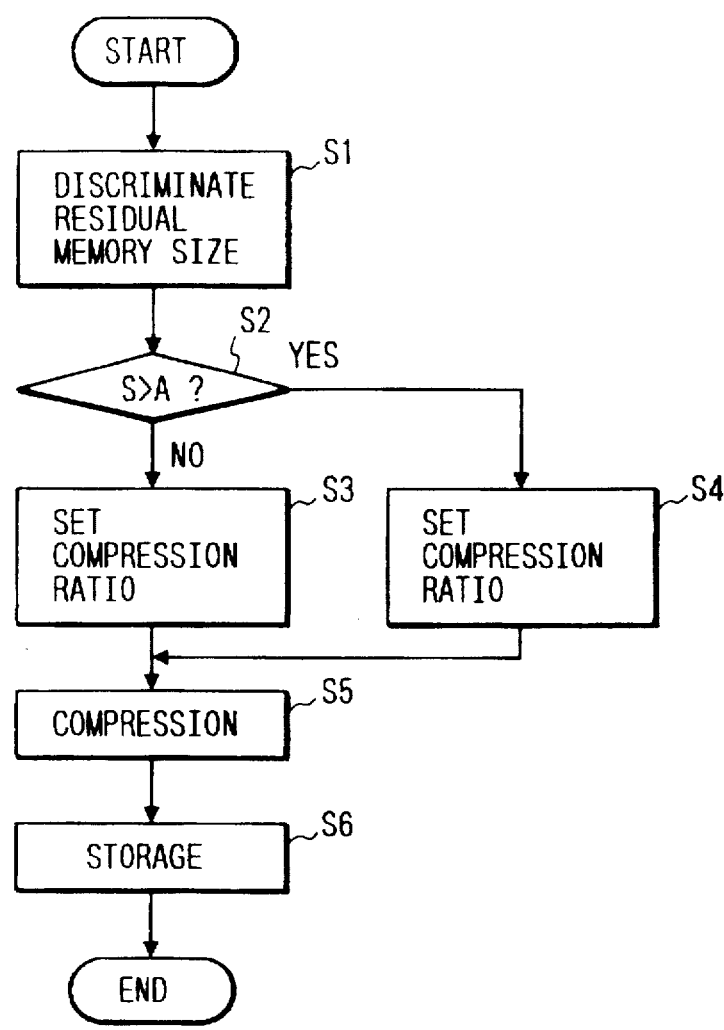
FIG. 9 is a flowchart showing a compressing process in the fourth embodiment.

In step S3 and S4 in FIG. 9, the compression ratio can be also similarly controlled by controlling the quantization step mentioned above.

A construction of a printer controller as an example of an apparatus in which the image processing apparatus according to the foregoing embodiment is assembled will now be described with reference to FIG. 13.

FIG. 13 is a diagram showing a whole construction of such an apparatus.

In FIG. 13, reference numeral 200 denotes an image input unit including a host computer. Image data supplied from the image input unit 200 is sent to an input terminal of an image storage unit 201 in each of the above embodiments. Reference numeral 202 denotes an operation unit which is used by the operator to designate an output destination of the image data or the like; 203 an output control unit to execute the selection of the output destination of the image data, the generation of a sync signal to read out the image data from a memory, and the like; 204 an image display unit such as a display or the like; 205 a transmission unit to transmit the image data through a public line (including a digital line) or a local area network (LAN); and 206 an image output unit such as a laser beam printer or the like to form a latent image by, for example, irradiating a laser beam onto a photosensitive material which upon development will produce a visible image. The image output unit 206 may be an ink jet printer, thermal copy transfer printer, dot printer, or the like. The sync signal is synchronized with, for instance, a BD signal to detect the scanning state of the laser beam of the image output unit 206. Or, the image output unit 206 may be what is called a bubble jet type printer using a head of the type in which a liquid droplet is discharged by causing film boiling by means of thermal energy.

The invention is not limited to only the above embodiments but can be also applied to, e.g., an apparatus to record an image signal an a medium such as electronic file, video recorder, video camera, or the like.

I claim:

1. An image processing apparatus which receives compressed image data and can store the compressed image data in storing means, comprising:

discriminating means for discriminating a data size of the compressed image data before said storing means stores the compressed image data;

means for expanding the received compressed image data when it is determined that the data size of the compressed image data discriminated by said discriminating means is larger than an effective size of said storing means; and compressing means for recompressing the image data expanded by said expanding means so that it can be stored in said storing means.

2. An apparatus according to claim 1, further comprising means for supplying the compressed data stored in said storing means to a printer.

3. An apparatus according to claim 2, wherein recompression is achieved by said compressing means by controlling compressing state by means of controlling a quantization value to quantize the data after completion of an orthogonal transformation.

4. An image processing system comprising;

means for inputting image information;

first compressing means for compressing image data corresponding to the image information input by said inputting means;

discriminating means for discriminating a data size of the compressed image data produced by said first compressing means;

means for expanding the received compressed image data when it is determined that the data size of the compressed image data discriminated by said discriminating means is larger than an effective size of a storing means; and second compressing means for compressing the image data expanded by said expanding means so that it can be stored in the storing means.

5. A system according to claim 4, further comprising a second expanding means for expanding compressed image data stored in the storing means.

6. A system according to claim 5, further comprising means for supplying image data expanded by said said second expanding means to an image forming device.

7. A system according to claim 6, wherein the image forming device is a printer.

8. A system according to claim 7, wherein the printer is a printer which discharges a liquid.

9. A system according to claim 8, wherein the printer discharges the liquid by causing a film boiling due to thermal energy.

10. A system according to claim 4, wherein the compressed image data is compressed multivalue image data.

* * * * *

UNITED STATES PATENT AND TRADEMARK OFFICE
CERTIFICATE OF CORRECTION

PATENT NO. : 5,757,965

DATED : May 26, 1998

INVENTOR : Joji Ohki

Page 1 of 3

It is certified that error appears in the above-identified patent and that said Letters Patent is hereby corrected as shown below:

ON TITLE PAGE

[56] References Cited  Foreign Patent Documents

"02100487 4/1990 Japan" should read --2-100487 4/1990 Japan--.

COLUMN 1 line 26, "stored" should read --stored to--; and
line 63, "in" should be deleted.

COLUMN 2 line 38, "Fig. 1" should read --Fig. 1;--; and
line 40, "Fig. 1" should read --Fig. 1;--.

COLUMN 3 line 26, "generate" should read --generate the data--; and
line 52, "kind" should be deleted.

COLUMN 4 line 3, "according" should read --accordance--; and
line 54, "an format" should read --a format--.

UNITED STATES PATENT AND TRADEMARK OFFICE
CERTIFICATE OF CORRECTION

PATENT NO. : 5,757,965

DATED : May 26, 1998

INVENTOR : Joji Ohki

It is certified that error appears in the above-identified patent and that said Letters Patent is hereby corrected as shown below:

COLUMN 5 line 15, "That is" should read --That is,--.

COLUMN 6 line 1, "for the compression" should read --is extracted in step--;
line 20, "compression" should read --compression units or not.-- and "of the final" should read --After completion of the compression of the final--;
line 43, "lager" should read --larger--; and
line 48, "wherein" should read --wherein,--.

COLUMN 7 line 52, "size S" should read --size S and --;
line 60, "made" should read --made,--;
line 61, "advance" should read --advance,-- and
line 64, "compressions" should read --compresses--.

COLUMN 8 line 32, "will" should read --will be--;
line 35, "structed" should read --struction--; and
line 52, "Dc" should read --DC--.

UNITED STATES PATENT AND TRADEMARK OFFICE
CERTIFICATE OF CORRECTION

PATENT NO. : 5,757,965

DATED : May 26, 1998

INVENTOR : Joji Ohki

It is certified that error appears in the above-identified patent and that said Letters Patent is hereby corrected as shown below:

COLUMN 9 line 20,   "a group" should read --the group--;
   line 22,   "number" should read --numbers--; and "and" should read --are--;
   line 31,   "and" should read --an--;
   line 52,   "reduces." should read --reduced.--; and
   line 55,   "indicative" should read --the compression ratio setting unit sets the value indicative--.

COLUMN 10 line 29,   "an" should read --on--.

COLUMN 11 line 8,   "said said" should read --said--.

Signed and Sealed this

Nineteenth Day of January, 1999

Attest:

*Acting Commissioner of Patents and Trademarks*

*Attesting Officer*